United States Patent [19]

Lumby et al.

[11] 4,113,503
[45] Sep. 12, 1978

[54] METHOD OF FORMING A CERAMIC PRODUCT

[75] Inventors: Roland John Lumby; Bernard North, both of Birmingham; Alfred James Taylor, Solihull, all of England

[73] Assignee: Lucas Industries Limited, Birmingham, England

[21] Appl. No.: 802,172

[22] Filed: May 31, 1977

[30] Foreign Application Priority Data

Jun. 3, 1976 [GB] United Kingdom ............... 22923/76

[51] Int. Cl.² ............................................. C04B 35/58
[52] U.S. Cl. ..................... 106/73.4; 106/60; 106/62; 106/65; 106/69; 106/73.5; 264/65
[58] Field of Search ....................... 106/65, 73.4, 73.5; 264/65

[56] References Cited

U.S. PATENT DOCUMENTS

| | | | |
|---|---|---|---|
| 3,890,250 | 6/1975 | Richerson | 106/44 X |
| 3,903,930 | 9/1975 | Kamigaito | 106/73.4 |
| 3,950,464 | 4/1976 | Masaki et al. | 106/65 |
| 3,953,221 | 4/1976 | Lange | 106/73.4 X |
| 3,989,782 | 11/1976 | Lumby et al. | 106/73.4 |
| 3,991,148 | 11/1976 | Lumby et al. | 106/73.4 |
| 3,991,166 | 11/1976 | Jack et al. | 106/73.4 |

OTHER PUBLICATIONS

Jack, K. H. et al., "Ceramics Based on the Si-Al-O-N and Related Systems" - Nature Physical Science, Jul. 10, 1972, 238, pp. 28-29.
Wills, R. R. et al., "Fabrication of Reaction-Sintered Sialon", J. Am. Cer. Soc., 60, No. 1-2, Jan.-Feb., 1977, pp. 64-67.
Yeh, H. C., et al., "Pressure Sintering of $Si_3N_4$-$Al_2O_3$ (Sialon)", Ceramic Bull., 56 (2), 1977.

Primary Examiner—Helen M. McCarthy
Attorney, Agent, or Firm—Holman & Stern

[57] ABSTRACT

In a method of forming a ceramic material of the kind including at least 90% by weight of a single phase silicon aluminium oxynitride which has a crystal structure based on β silicon nitride but of increased unit cell dimensions and which obeys the general formula:

$$Si_{6-z}Al_zN_{8-z}O_z$$

where z is greater than 0 and less than or equal to 5, a ceramic intermediary is produced which contains a silicon aluminium oxynitride which obeys a different formula from said general formula. The intermediary is then heated in powder form at a temperature between 1200° C and 2000° C in a protective environment with at least one compound containing two or more of the elements silicon, aluminium, oxygen and nitrogen, the composition of said intermediary and the amount of said at least one compound being such that said intermediary is converted at said temperature into said ceramic material.

6 Claims, 1 Drawing Figure

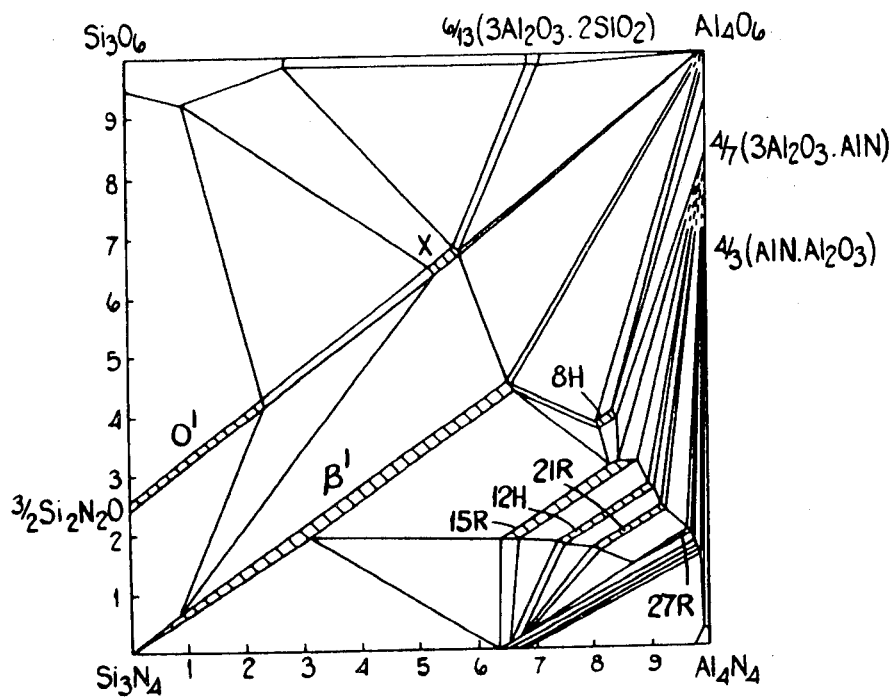

METHOD OF FORMING A CERAMIC PRODUCT

SUMMARY OF THE INVENTION

This invention relates to a method of forming a ceramic material of the kind including at least 90% by weight of a single phase silicon aluminium oxynitride which has a crystal structure based on β-silicon nitride but of increased unit cell dimensions and which obeys the general formula:

$$Si_{6-z}Al_zN_{8-z}O_z$$

(hereinafter referred to as the first formula) where $z$ is greater than 0 and less than or equal to 5.

According to the invention, a method of forming a ceramic material of the kind specified comprises the steps of:

a. producing a ceramic intermediary containing a silicon aluminium oxynitride which obeys a different formula from said general formula, and b. with said intermediary in powder form, heating the intermediary at a temperature between 1200° C. and 2000° C. in a protective environment and in the presence of at least one compound containing two or more of the elements silicon, aluminium, oxygen and nitrogen, the composition of said intermediary and the amount of said at least one compound being such that said intermediary is converted at said temperature into said ceramic material.

Preferably, the silicon aluminium oxynitride contained by said intermediary is rich in aluminium and nitrogen as compared with said general formula and more preferably is one of the phases indicated at 15R, 12H, 21R and 27R in the attached quaternary phase diagram. Preferably, step (a) is performed by heating a mixture of alumina, aluminium nitride and silicon nitride at a temperature between 1200° C. and 2000° C. in a protective environment.

Alternatively step (a) is performed by heating a mixture of aluminium, silicon and alumina to between 1200° C. and 1400° C. in a nitriding atmosphere, the heating rate being controlled so as to substantially prevent exotherming, and then sintering the nitrided mixture at a temperature between 1500° C. and 2000° C.

Preferably, step (b) is performed by heating at said temperature a powder mixture containing said intermediary, silicon nitride and silica, at least part of the silica being present as an inherent impurity on the silicon nitride.

Preferably, one or more glass-forming oxides are also present during step (b), the or each glass-forming oxide being chosen so as to react with silica also present at said temperature to produce a silicate glass, which aids liquid phase sintering of said ceramic material into a coherent ceramic product.

Preferably, said one or more glass forming oxides constitutes up to 10% by weight of the mixture heated during step (b).

Preferably, the powdered intermediary and one or more powdered solid phase compounds of said elements are mixed with an organic binder in an aqueous carrier liquid, a preform is then formed from the mixture and, after removal of the carrier liquid, step (b) is performed by heating said preform at said temperature, in a protective environment and with or without the application of pressure.

BRIEF DESCRIPTION OF THE DRAWING

The accompanying drawing is a quaternary phase diagram indicating the various silicon aluminium oxynitride ceramic phases which exist in the silica-alumina-silicon nitride-aluminium nitride system.

DETAILED DESCRIPTION OF PREFERRED EMBODIMENTS

Referring to the drawing, of the various phases in the system shown, the reference character $\beta'$ indicates the ceramic material which is based on the hexagonal β-phase silicon nitride, crystal lattice but is of increased unit cell dimensions and which obeys the first formula $Si_{6-z}Al_zN_{8-z}O_z$ where $z$ is greater than 0 and less than or equal to 5. The remaining reference characters identify the other possible phases which obey the following approximate formulae:

8H — $Si Al_3 O_2 N_3$
15R — $Si Al_4 O_2 N_4$
X — $Si Al O_2 N$
12H — $Si Al_5 O_2 N_5$
21R — $Si Al_6 O_2 N_6$
27R — $Si Al_8 O_2 N_8$
O' — $Si_l AL_{2-l} O_{3-l} N_l$ where $l$ is greater than approximately 1.3 and less than or equal to 2 and where $R$ indicates a phase having a rhombohedral crystal structure, $H$ indicates a phase having a hexagonal crystal structure and $O'$ indicates an expanded silicon oxynitride phase.

The method of the invention is concerned with the production of a ceramic material containing at least 90% by weight of the phase referred to as $\beta'$, this material being desirable since it enables the production of sintered ceramic products exhibiting high modulus of rupture values and an advantageous oxidation resistance at high temperatures. Such a material is normally obtained by sintering a mixture of silica, alumina, aluminium nitride and preferably silicon nitride but this process suffers from the problem that aluminium nitride exhibits a marked tendency to undergo hydrolysis, which means, inter alia, that production routes involving water-based binders cannot be satisfactorily employed. It has, however, now been found that the required ceramic material can also be produced by conversion of other silicon aluminium oxynitride ceramic phases and that by use of such a method the presence of aluminium nitride in the starting materials can, if desired, be avoided and the problem of hydrolysis thereby overcome. Thus, in a first example of the invention a mixture consisting of 42 parts by weight of aluminium as supplied by The Aluminium Company of America with a particle size of about 20 microns, 14 parts by weight of silicon as supplied by Union Carbide Limited with an average particle size of 3 microns and 44 parts by weight of alumina supplied by Linde as Type B and having a nominal particle size of 0.05 micron was introduced into an alumina boat and then heated in a nitriding furnace. The nitriding atmosphere supplied to the furnace consisted of 64% by volume nitrogen, 6% by volume hydrogen and 30% by volume argon and, during nitriding, the temperature was carefully controlled to prevent thermal runaway by means of separate thermocouples in the reaction mixture and the furnace walls respectively. In particular, the temperatures registered by the thermocouples were compared and, if the temperature in the mixture exceeded that in the furnace walls, the supply of the nitriding atmosphere was terminated until the temperature in the mixture fell below that in the walls. A heating schedule which allowed the nitriding to proceed with a minimum amount of interruption was as follows:

(a) raising the temperature at a rate of 100° C./hour to 500° and holding for 24 hours,
(b) increasing the temperature at said rate from 500° C. to 600° C. and holding for 7 hours,
(c) increasing the temperature at said rate from 600° C. to 1000° C. and holding for 24 hours,
(d) increasing the temperature at said rate from 1000° C. to 1100° C. and holding for 18 hours,
(e) increasing the temperature at said rate from 1100° C. to 1200° C. and holding for 5 hours,
(f) further increasing the temperature at said rate to 1300° C. and holding for 20 hours, and
(g) still further increasing the temperature at said rate to 1350° C. and holding for 6 hours.

After completion of the heating process, the nitrided material was allowed to cool in an argon atmosphere and was then removed from the furnace. The material was then jaw crushed and cone ground to a particle size below 500 microns and thereafter was cold isostatically pressed at 15000 psi into a pellet which was then introduced into a graphite pot and buried in boron nitride powder to provide a protective environment for the subsequent sintering operation. The temperature of the pot was then raised 1½ hours from room temperature to 1500°–2000° C. preferably 1800° C., and then held at this temperature for 1 hour. Apart from some unconverted oxides, the resultant sintered product consisted substantially entirely of a single phase ceramic material of the type referred to above as 15R.

After removal of the graphite pot, the sintered product, in the form of a cake, was jaw cruched, cone ground and then colloid milled to an average particle size of 7 microns. 14.6 parts by weight of the ground 15R material were then mixed with 85.4 parts by weight of 3 micron average particle size silicon nitride powder containing 89% by weight of the αphase material and 4% by weight of silica as an inherent impurity. To this mixture was added 1 part by weight of magnesium oxide power, as a glass former to aid densification, whereafter the overall mixture was colloid milled using iso-propyl alcohol as the carrier liquid. After removal of the carrier liquid, the mixture was sieved and then hot pressed in a graphite die which had been spray-coated with boron nitride powder to provide a protective environment. Hot pressing was effected in 2.25 hours at a temperature of 1780° C. and a pressure of 1t.s.i. and during hot pressing the 15R material reacted with the silicon nitride and the silica impurity to produce the required $\beta'$ material. Thus the ceramic phase of the resultant ceramic product was found to contain in excess of 90% by weight of a single phase $\beta'$ ceramic material obeying said first formula where $z$ was equal to about 0.76. In addition, the product was found to have a density of 3.167 gm/c.c., a room temperature modulus of rupture of 114,000 p.s.i., and a Weibull modulus of 12. The method of the above example was also repeated with the aluminium, silicon and alumina powders in the initial mixture being in the weight proportions 46:14:5:39.5 respectively. In this case, the product after the initial nitriding and sintering process consisted solely of the 15R material without unconverted oxides.

In a further modification, the method of the first example was again repeated but in this case, after production of the powdered 15R ceramic material, 12 parts by weight of this material were mixed with 88 parts by weight of the silicon nitride employed previously. Again 1 part by weight of magnesium oxide was added to the resultant mixture and, after the hot pressing procedure of the first example, there was obtained a product containing in excess of 90% by weight of a single phase $\beta'$ ceramic material obeying said first formula with $z$ being equal to about 0.6. In this case the density of the ceramic product was 3.166 gm/c.c., its room temperature modulus of rupture was 117,000 p.s.i. and its Weibull modulus was 14.

In a second example, a 15R ceramic intermediary was produced by sintering a mixture consisting of 33.56% by weight alumina, 48.65% by weight aluminium nitride and 17.8% by weight of silicon nitride at 1800° C. for 1 hour, with the mixture being surrounded by boron nitride powder to provide a protective environment. The method then proceeded as in the first example.

In a third example, 12 parts by weight of the 15R ceramic intermediary produced in the first example were mixed with 88 parts by weight of the silicon nitride powder employed previously. 6.5 parts by weight of magnesium oxide were then added to the resultant mixture and the composition was colloid milled during iso-propyl alcohol as the carrier liquid. After drying and sieving, the milled mixture was cold isostatically pressed in a rubber bag at 20.000 p.s.i., and the resultant preform was then spray coated with a protective mixture of 50% by weight boron nitride and 50% by weight silica in a ketone carrier liquid. Thereafter, the temperature of the coated preform was raised, without pressure being applied to the preform, to 1820° C. in 1 hour and the preform then held at this temperature for 60 minutes to produce a ceramic material of the kind specified. The product had a density of 3.04 gm/c.c., a room temperature modulus of rupture of 69,000 p.s.i., and a Weibull modulus of 10.

In a fourth example, 100 grms of the milled mixture of silicon nitride, 15R ceramic intermediary and magnesium oxide obtained in the preceding example were mixed in a Sigma blade mixer with 35 ml of a 50/50 by volume dispersion of an Acronal 16D acrylic binder in water, the as supplied acrylic binder containing 50% by weight of solids. The resultant mixture was then compression molded into a preform at 4.5 t.s.i., and subsequently left to dry for 8 hours. The resultant preform was then heated at 500° C. for 2 hours to burn off the acrylic binder and thereafter was subjected to the spray coating and sintering operations of the preceding example. The resultant product had a density of 2.9 gm/c.c.

Although the above examples have only involved the use of the ceramic intermediary referred to as 15R, it is to be appreciated that the method described above can also be performed with one or more of the other ceramic intermediaries indicated in the accompanying drawing. It is, however, preferred that these intermediaries are rich in aluminium and nitrogen as compared with the required $\beta'$ material since this enables the final conversion into the $\beta'$ material to be performed without the addition of aluminium nitride so that, as in the fourth example, an aqueous binder can be used to aid molding of the conversion mixture into a suitably shaped body. Hence the preferred intermediaries are the phases referred to as 15R, 8H, 12H, 21R and 27R, with the former being the most preferred.

To demonstrate the use of other ceramic intermediaries than 15R, in the fifth example of the invention the starting materials employed previously were used to produce a mixture consisting of 57 parts by weight of aluminium, 9 parts by weight of silicon and 34 parts by weight of alumina. The mixture was introduced into an alumina boat and subjected to the following heating schedule in the nitriding atmosphere of the first example:

(a) raising the temperature at a rate of 100° C./hour from room temperature to 470° C. and holding for 20 hours, (b) raising the temperature at said rate from 470° C. to 600° C. and holding for 20 hours, (c) then increasing the temperature at said rate to 1000° C. and holding for 45 hours, (d) increasing the temperature at said rate from 1000° C. to 1200° C. and holding for 24 hours, (e) further increasing the temperature at said rate of 1300° C. and holding for 20 hours, and (f) finally increasing the temperature at said rate to 1350° C and holding for 20 hours.

When the nitriding process was complete, the nitrided material was subjected to the further treatment used in the first example and, after the sintering at 1500°–1900° C. was subjected to X-ray diffraction which demonstrated that the ceramic phase consisted of the material 21R with up to 20 by weight % of the material 12H. To produce the required $\beta'$ material, 11.5 parts by weight of the powdered, composite intermediary were mixed with 88.5 parts by weight of silicon nitride powder and one part by weight of a magnesium oxide powder glass former was added to the resultant mixture. Treatment then followed in the procedure of the first example.

The method described above can also be performed with the 21R material alone defining the required ceramic intermediary. This is effected in accordance with a sixth example of the invention by using the starting materials of the previous example to produce an initial mixture consisting of 62 parts by weight of aluminium, 13 parts by weight of silicon and 25 parts by weight of alumina. This mixture is then subjected to the nitriding and sintering schedule of the previous example to produce the required 21R material which, after crushing, grinding and colloid milling, is mixed with silicon nitride powder in a weight ratio of 10.5:89.5 respectively. One part by weight of glass former such as magnesium oxide is then added to the mixture, whereafter the mixture is subjected to the hot pressing treatment of the first example. This results in a dense, strong product in which the ceramic phase contains more than 90% of the $\beta'$ material.

Similar results are obtained when the ceramic intermediary is the material 12H alone. Thus, in a seventh example, the starting materials employed previously are used to produce an initial starting mixture consisting of 56 parts by weight of aluminium 15 parts by weight of silicon and 29 parts by weight of alumina. The final $\beta'$ material is then produced by mixing 11.5 parts by weight of the 12H material with 88.5 parts by weight of silicon nitride, adding one part by weight of magnesium oxide to the resultant mixture and subsequently following the hot pressing procedure of the first example.

By the same token, the ceramic intermediary can be the 27R material, in which case the starting mixture conveniently consists of 71 parts by weight of aluminium powder, 7 parts by weight of silicon powder and 22 parts by weight of alumina powder. After repeating the nitriding and sintering procedure of the fifth example, the resultant 27R material is mixed in powder form with silicon nitride powder in a weight ratio of 8.5:91.5 respectively. After addition of a suitable glass former, the mixture is hot pressed to produce a final product in which the ceramic phase contains in excess of 90% of the $\beta'$ material. Although magnesium oxide has been used as the glass forming oxide in each of the above examples, it is to be appreciated that other glass forming oxides could have been added either alone or in combination to the final mixture to be sintered with or without the application of pressure. Examples of other suitable glass forming oxides are manganese oxide, iron oxide, boron oxide and lithium oxide. Further, it is to be appreciated that the amount of glass forming oxide (s) in the final mixture can constitute up to 10% by weight of the mixture, although high oxide contents lead to large amounts of glass in the resultant product which may be undesirable for high temperature use of the product, especially under high load conditions.

Further is to be appreciated that although the $\beta'$ material produced in the above examples have had z values of up to about 1, higher z values can be obtained by adding, for example, silica and/or alumina to the final mixture of the ceramic intermediary and silicon nitride. The silica and/or alumina would be added in amounts necessary to produce the required 90% by weight of $\beta'$ in the sintered ceramic material, the amounts conveniently being calculated by reference to the phase diagram shown in the drawing. In this respect, the 8H material can be useful ceramic intermediary for the production of high z values.

We claim:

1. A method of forming a ceramic material consisting of at least 90% by weight of a single phase silicon aluminium oxynitride obeying the formula:

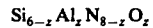

$$Si_{6-z}Al_zN_{8-z}O_z$$

where z is greater than 0 and less than or equal to 5, comprising the steps of:

a. producing a ceramic intermediary containing a silicon aluminium oxynitride which is one of the phases indicated at 15R, 8H, 12H, 21R and 27R in the attached quaternary phase diagram, and b. with said intermediary in powder form, heating the intermediary at a temperature between 1200° C. and 2000° C. in a protective environment and in the presence of silicon nitride and silica, at least part of the silica being present as an inherent impurity on the silicon nitride, the composition of said intermediary and the amount of said silicon nitride and silica being such that said intermediary is converted at said temperature into said ceramic material.

2. The method as claimed in claim 1, wherein step (a) is performed by heating mixture of alumina, aluminum nitride and silicon nitride at a temperature between 1200° C. and 2000° C. in a protective environment.

3. The method as claimed in claim 1 wherein step (a) is performed by heating a mixture of aluminum, silicon and alumina to between 1200° C. and 1400° C. in a nitriding atmosphere, the heating rate being controlled to substantially prevent exotherming, and then sintering the nitrided mixture at a temperature between 1500° C. and 2000° C.

4. The method as claimed in claim 1 wherein at least one oxide selected from the group consisting of magnesium oxide, manganese oxide, iron oxide, boron oxide, and lithium oxide is also present during step (b) the at least one oxide being chosen so as to react with silica also present at said temperature to produce a silicate glass, which aids sintering of said ceramic material into a coherent ceramic product.

5. The method as claimed in claim 4 wherein said at least one oxide constitutes up to 10% by weight of the mixture heated during step (b).

6. The method as claimed in claim 1, wherein the powdered intermediary, silicon nitride and silica are mixed with an organic binder in an aqueous carrier liquid, a preform is then formed from the mixture and, after removal of the carrier liquid, step (b) is performed by heating said preform at said temperature, in a protective environment and with or without the application of pressure.

* * * * *